United States Patent [19]
Kalverkamp

[11] Patent Number: 5,269,126
[45] Date of Patent: Dec. 14, 1993

[54] ADAPTER FOR USE WITH HARVESTING MACHINES FOR CORN AND THE LIKE

[76] Inventor: Klemens Kalverkamp, Possenbrock 29, D-4730 Ahlen, Fed. Rep. of Germany

[21] Appl. No.: 878,765

[22] Filed: May 5, 1992

[51] Int. Cl.⁵ .................... A01D 45/02; A01D 49/00
[52] U.S. Cl. ........................................... 56/60; 56/500
[58] Field of Search .................. 56/60, 500, 502, 504, 56/505; 460/112

[56] References Cited

U.S. PATENT DOCUMENTS

| | | | |
|---|---|---|---|
| 3,863,431 | 2/1975 | Fowler | 56/502 |
| 4,646,757 | 3/1987 | Schmitt et al. | 460/112 |
| 4,845,930 | 7/1989 | Dow | 56/113 |
| 4,864,807 | 9/1989 | Ostrup et al. | 56/500 X |
| 5,161,356 | 11/1992 | Pick | 56/500 X |

FOREIGN PATENT DOCUMENTS

3828358 2/1990 Fed. Rep. of Germany .
3930777 7/1990 Fed. Rep. of Germany .

Primary Examiner—David J. Bagnell
Attorney, Agent, or Firm—Darby & Darby

[57] ABSTRACT

A stalk chopping adapter has a frame which can be attached to the front end of a harvester combine and supports two forwardly extending downwardly inclined parallel rotors which are driven in opposite directions. The rotors have longitudinally extending axially parallel or helical blades which cooperate to draw delivered stalks downwardly and to crush and/or sever the stalks. Alternatively, the blades of one of the rotors are slotted and only this rotor cooperates with stationary knives to sever stalks which are advanced toward the ground of a field for crops to be harvested under the combined action of the blades on the two rotors. The knives can be mounted on a cover which is pivotally mounted on the frame is adjacent the underside of the rotor having unslotted blades.

24 Claims, 7 Drawing Sheets

ADAPTER FOR USE WITH HARVESTING MACHINES FOR CORN AND THE LIKE

BACKGROUND OF THE INVENTION

The invention relates to improvements in harvesting machines in general, and more particularly to improvements in machines for harvesting corn and/or other stalk-type crops. Still more particularly, the invention relates to improvements in stalk chopping adapters or attachments for use with machines for harvesting corn and/or other stalk-type crops.

It is already known to provide a stalk chopping adapter with a single rotor and to employ a shroud or cover which partially surrounds the rotor. The shroud cooperates with the cutting and/or entraining edges of blades on the single rotor. An advantage of such adapter is that its energy requirements are low.

It is also known to provide a stalk chopping adapter with two rotors which are driven to rotate in opposite directions. Reference may be had, for example, to German patent application No. 39 30 777 of Ostrup et al. (published Jul. 19, 1990). One of the knives which cooperate with the blades of the other rotor to comminute the stalks. The energy requirements of the adapter which is disclosed by Ostrup et al. are rather high. It is desirable and important to reduce such energy requirements to a minimum without affecting the efficiency of the adapter. Another important requirement, which is not met by heretofore known adapters is that the comminuted stalks be uniformly distributed over the ground in the course of the harvesting operation. As a rule, a known adapter will deposit the comminuted stalks in the form of a relatively narrow row of superimposed fragments. Such fragments are not likely to disintegrate within a short interval of time and will not adequately fertilize the soil. Moreover, accumulations of pile-up comminuted stalks create problems in connection with ploughing under prior to planting. Accordingly, there exists an urgent need for a more satisfactory stalk chopping adapter which can be used with existing harvesting machines to ensure satisfactory comminution and equally satisfactory distribution of comminuted stalks.

OBJECTS OF THE INVENTION

An object of the invention is to provide a novel and improved stalk chopping adapter or attachment which can be utilized as a superior substitute for heretofore known adapters.

Another object of the invention is to provide a novel and improved twin-rotor stalk chopping adapter for use in connection with the harvesting of corn or other stalk-type crops.

A further object of the invention is to provide an adapter whose energy requirements are low even though it employs plural rotors.

An additional object of the invention is to provide a stalk chopping adapter which ensures uniform distribution, or predictable and satisfactory distribution, of chopped stalks of corn or other stalk-type crops.

Still another object of the invention is to provide novel and improved rotors for use in the above outlined stalk chopping adapter.

A further object of the invention is to provide a novel and improved combination of knives and rotors in the above outlined adapter.

Another object of the invention is to provide a stalk chopping adapter wherein the parts which require frequent maintenance, inspection and/or repair are readily accessible.

An additional object of the invention is to provide an adapter wherein all parts which are likely to injure a careless operator are adequately shielded and/or concealed.

Still another object of the invention is to provide the above outlined adapter with novel and improved means for delivering or feeding stalks into the range of comminuting instrumentalities.

A further object of the invention is to provide an adapter which is simple and inexpensive and can be coupled to existing prime movers for transport along the field to gather ears of corn and to simultaneously comminute the stalks.

Another object of the invention is to provide a novel and improved method of enhancing the distribution of comminuted stalks which are produced by the above outlined adapter.

An additional object of the invention is to enhance the output of a stalk chopping adapter.

SUMMARY OF THE INVENTION

One feature of the present invention resides in the provision of a stalk chopping adapter or attachment for use with a mobile machine for harvesting corn and other stalk type crops. The improved adapter comprises a frame or housing which is connectable to the front part of and is movable by the harvesting machine along a crop growing field, first and second substantially parallel elongated rotors which are supported by the frame and are adjacent the ground of the crop growing field during harvesting (the axes of the rotors can be horizontal but it is often preferred to mount the rotors in such a way that they extend forwardly and slightly downwardly when the machine is in use), a plurality of substantially longitudinally extending slotted first external blades forming part of and being provided on a longitudinally extending core or shaft of the first rotor (the first blades can be straight or at least slightly helical), a plurality of substantially longitudinally extending second external blades provided on a longitudinally extending core or shaft of the second rotor (the second blades can be straight or at least slightly helical), means for directing stalks between the rotors, means for driving the rotors in opposite directions so that the stalks which are directed between the two rotors are engaged and entrained by the first and second blades in a downward direction toward the ground, and stationary knives which are carried by the frame and extend into the slots of the first blades to sever the stalks in cooperation with the first but not with the second blades. Thus, the second blades can cooperate with the first blades to entrain the stalks toward the ground and they can cooperate with the first blades to squash, crush or at least partially sever the stalks. However, the knives do not cooperate with the second blades but only with those portions of the first blades which are adjacent the respective slots.

The adapter can further comprise a cover which overlies the underside of the second rotor. Such cover can form part of or can carry means for pivotally connecting the knives to the frame. For example, the cover can be pivotally connected to the frame and the knives can be rigidly but preferably adjustably secured to the cover.

At least one of the second blades can have a substantially U-shaped, a substantially L-shaped or a substantially V-shaped cross-sectional outline.

Furthermore, at least one of the first and/or second blades can have a longitudinally extending cutting edge which can be provided at the radially outermost part of the respective blade. If at least one first blade and at least one second blade has a cutting edge, such cutting edges cooperate to crush and/or at least partially sever stalks between the two rotors.

The radially outermost portions of the first blades orbit along a first circular path (e.g., along a path which can resemble an elongated cylinder or an elongated cone), and the radially outermost portions of the second blades orbit along a second circular path which can touch, come close to or intersect the first path. In the latter instance, the driving means includes means for rotating the rotors in such a way that the first and second blades bypass each other. Such mounting and shaping of the rotors can be resorted to regardless of whether at least one first blade and/or at least one second blade has a cutting edge.

If the two circular paths merely touch or come close to each other (or even if they intersect one another), the rotors can be driven in such a way that the radially outermost portions of first blades slide along the radially outermost portions of the second blades or vice versa.

The aforementioned cover can be dimensioned and configurated in such a way that it at least partially conforms to the path for the radially outermost portions of the second blades, particularly the lower part of such path. As already mentioned above, the cover can be (fixedly or pivotally) supported by the frame, and the knives can be carried by the cover. At least one counterknife can be installed on the cover to cooperate with the second blades, particularly for the purpose of stripping the stalks off the second rotor in response to rotation of the rotors.

The rotors have front end portions which are located at or are nearer to the front end of a properly mounted adapter, and rear portions which are nearer to the machine. The adapter can further comprise at least one cutter which is carried by the frame at the front end portions of the rotors and has means for severing the stalks close to the ground while the machine is in motion. The stalks can be directed between the two rotors prior to, during or subsequent to severing by the cutter or cutters. Each cutter can include a rotary disc having a smooth or toothed peripheral cutting edge. Alternatively, each cutter can have an arcuate cutting edge which faces in the direction of forward movement of the machine. If the blades of at least one of the rotors form helices around the core of the respective rotor, the cutter can conform to the outlines of helices of the respective rotor.

Another feature of the invention resides in the provision of a stalk chopping adapter for use with a mobile machine for harvesting corn and other stalk type crops. The adapter comprises a frame which is connectable with and is movable by the machine, and first and second substantially parallel elongated rotors which are supported by the frame. The first rotor comprises a first set of elongated straight or helical at least substantially longitudinally extending blades, and the second rotor comprises a second set of elongated substantially longitudinally extending straight or helical blades. The adapter further comprises means for directing stalks between the rotors, and means for driving the rotors in opposite directions so that the two sets of blades engage and entrain the stalks downwardly. At least one blade of at least one of the two sets of blades is preferably provided with a cutting edge. In fact, all of the blades can have cutting edges so that the blades of the first set can cooperate with the blades of the second set to crush and/or at least partially sever the stalks which are directed between the rotors while the rotors are driven.

The radially outermost portions of blades of the first set orbit along a first circular path and the radially outermost portions of the blades of the second set orbit along a second circular path when the rotors are driven. One of the two paths can intersect the other path but the operation of the driving means is selected in such a way that the blades of the first set bypass the blades of the second set when the rotors are driven.

The radially outermost portions of the blades of the first set can slide along the radially outermost portions of the blades of the second set when the rotors are driven.

A closure or cover can be installed on the frame adjacent a portion of the path for the radially outermost portions of the blades of the second set. The inner side of such cover preferably conforms, at least substantially, to a portion of the path for the radially outermost portions of the blades of the second set. At least one counterknife can be provided on the cover to cooperate with the blades of the second set, particularly to strip stalks off the second rotor.

At least one cutter can be installed in or on the frame at the front end portions of the rotors to sever the stalks close to the ground while the machine in in motion.

The novel features which are considered as characteristic of the invention are set forth in particular in the appended claims. The improved adapter itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 7:
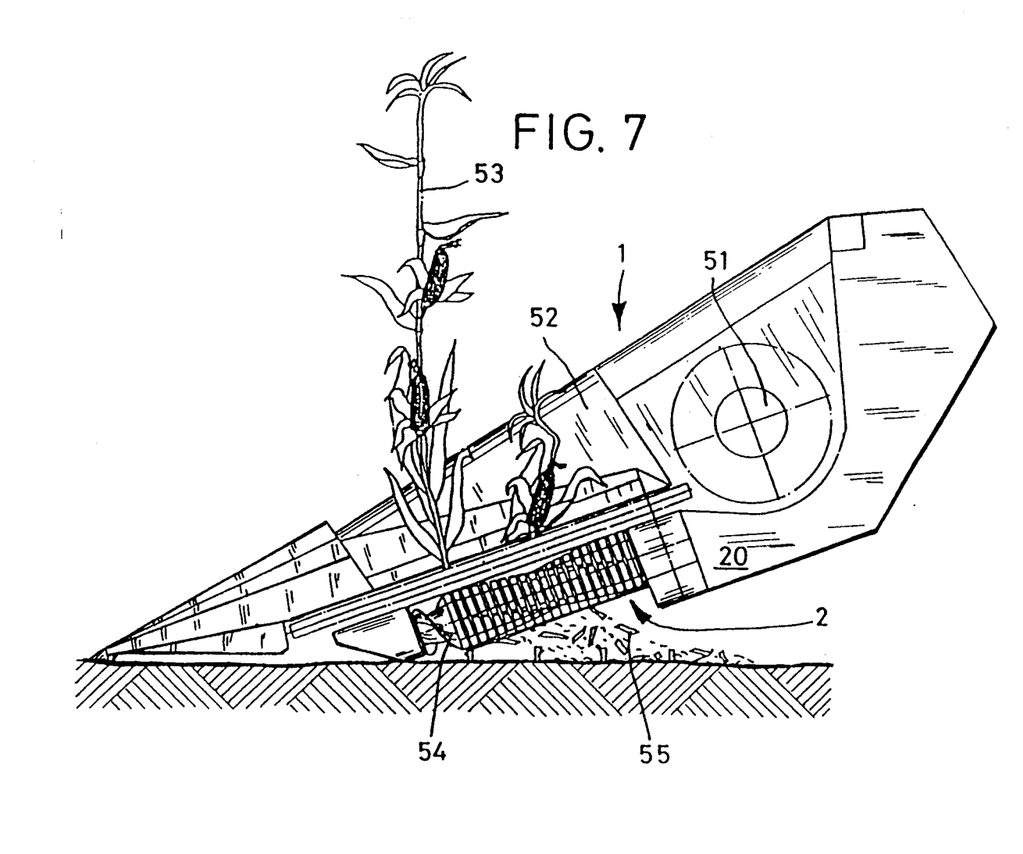
FIG. 7 is a smaller-scale schematic side elevational view of an adapter which embodies the invention, two stalks being shown in the process of undergoing shredding by the two rotors or by one of the rotors in cooperation with a set of stationary knives.

Referring first to FIG. 7, there is shown an adapter or attachment 1 which embodies one form of the invention. The adapter comprises a housing or frame 20 which is pivotally connectable (at 51) to a mobile harvesting machine, not shown. The frame carries two parallel elongated forwardly extending and downwardly sloping rotors 2 and 10 (only the rotor 2 can be seen in FIG. 7). A first corn stalk 52 is in the process of being comminuted (chopped) by the blades of the rotor 2 in combination with a set of knives 8 (see FIGS. 1 and 8), and a second stalk 53 is about to be chopped as the harvesting machine continues to advance the housing 20 in a direction to the left, as viewed in FIG. 7.

Figure 8:
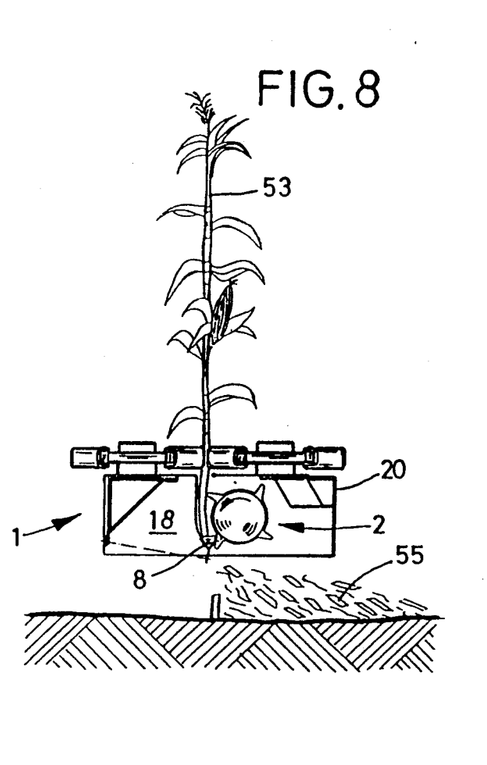
FIG. 8 is a fragmentary front elevational view of the adapter of FIG. 7.

FIG. 8 is a front elevational view of a portion of the adapter 1. The second rotor 10 (FIG. 1) is concealed behind a cover 18 which is adjacent primarily the underside of the rotor 10 and carries the knives 8. The cover 18 is connected to the frame 20 by a pivot member 17 (e.g., the pintle of a hinge) and, together with the pivot member 17, constitutes a means for securing the knives 8 to the frame 20.

Figure 1:
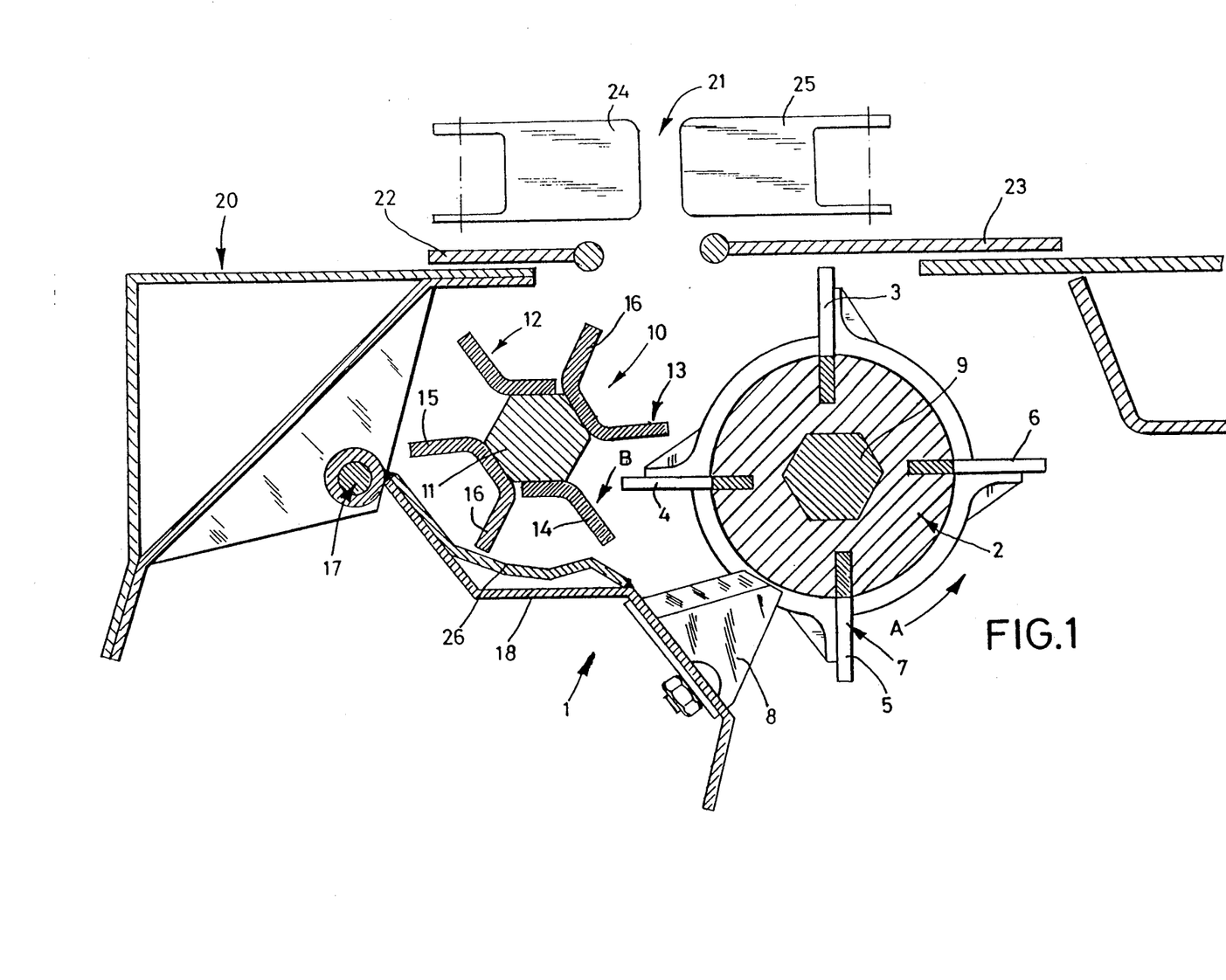
FIG. 1 is a fragmentary transverse substantially vertical sectional view of an adapter which embodies one form of the present invention.

Referring to FIG. 1 in greater detail, the rotors 2 and 10 are driven by the engine of the harvesting machine to rotate in opposite directions (indicated by arrows A and B), e.g., through a set of mating gears, by belt or chain transmissions or in any other suitable way, not shown. The rotor 2 has four equidistant elongated substantially radially outwardly extending blades 3, 4, 5 and 6. Each of these blades can be exactly parallel to the central longitudinal rotational axis of the rotor 2, or each such blade can have a helical shape (see FIG. 7). The blades 3 to 6 are provided with longitudinally spaced apart slots 7, and the slots 7 of each blade are aligned with the slots of each other blade in the circumferential direction of the rotor 2. This enables the cutting edges of the at least one row of knives 8 to cooperate with the cutting edges bounding the respective slots 7 to chop the stalks 52, 53 and the next-following stalks which are being separated from their roots by one or more severing devices 54 (FIG. 7) at the front ends of the rotors 2 and 10.

The frame 20 carries two endless chains having stripper plates 24, 25 at a level above the rotors 2, 10, and such stripper plates serve as a part of means for delivering successive stalks 52, 53 . . . between the two rotors. The two illustrated stripper plates 24, 25 define an elongated gap 21, and the effective width of this gap can be selected by two displaceable gap width adjusting members 22, 23 at a level above the top wall of the frame 20. As regards the mode of installing and driving the chains which include the stripper plates 24 and 25, reference may be had to U.S. Pat. No. 4,845,930 granted Jul. 11, 1989 to Dow for "Corn Ear Cutter Machine" which further shows the mode of cutting ears of corn, i.e., of separating such ears from the stalks.

The means for releasably locking the cover 18 in the operative position of FIG. 1 is not shown in the drawing. The locking means can be disengaged, when necessary, in order to permit convenient pivoting of the cover 18 about the axis of the pivot member 17 (in a clockwise direction, as viewed in FIG. 1) in order to gain access to the knives 8, to the slotted blades 3 to 6 of the rotor 2, and to the rotor 10.

The cylindrical body of the rotor 2 is mounted on a shaft 9 which forms part of the drive means for this rotor, and the rotor 10 comprises a set of four longitudinally extending straight or at least slightly helical vanes or blades 12, 13, 14 and 15. The blades 13, 15 have pairs of substantially radially outwardly extending sections 16, and each of the blades 12, 14 has a single substantially radially outwardly extending section 16. These blades are secured to a drive shaft 11 which is parallel to the shaft 9. The blades 12 and 14 can be said to have a substantially V-shaped or L-shaped cross-sectional outline, and each of the blades 13, 15 has a substantially U-shaped cross-sectional outline. The transmission ratio between the prime mover of the harvesting machine and the shafts 9, 11 is preferably selected in such a way that the rotational speed of the rotor 10 exceeds that of the rotor 2.

The inner side of the cover 18 is provided with a lid or shroud 26 which can be welded or otherwise reliably affixed thereto. The inner side of the lid 26 substantially conforms to the lower part of the path of orbital movement of the radially outermost portions or edges of the six sections 13 on the blades 12-15 of the rotor 10. The purpose of the lid 26 is to cooperate with the blades 12-15 in order to direct the stalks 52, 53 . . . toward the chopping station, i.e., toward the locations where the knives 8 cooperate with the orbiting blades 3-6 of the rotor 2 in order to comminute the stalks. The peripheral speed of the blades 3-6 is sufficiently high to ensure that the trajectories of shredded stalks (FIG. 8) are relatively long so that the fragments 55 of such stalks are distributed over a wide area of the ground beneath the path of forward movement of the adapter 1. This is desirable and advantageous for more satisfactory ploughing under as well as for more pronounced and more uniform decomposition of fragments 55 and hence more satisfactory fertilization of the soil. FIG. 8 clearly shows that the fragments 55 of comminuted stalks do not form longitudinally extending piles or similar accumulations which would prevent predictable and rapid decomposition of all fragments. A conventional adapter is likely to form a pronounced longitudinally extending pile up of fragmented stalks in the region between and beneath the two rotors. More satisfactory distribution of fragments 55 in accordance with the present invention is believed to be attributable, at least in part, to the feature that the knives 8 cooperate only with the blades 3-6 of the rotor 2, i.e., that the rotor 10 does not participate in the formation of fragments. Moreover, the level of the knives 8 is sufficiently low (close to the ground) to enable the blades 3-6 to propel the fragments 55 to the right (as viewed in FIG. 1) and well beyond the six o'clock position of the rotor 2.

Another advantage of the adapter 1 which includes the structure of FIG. 1 is that the combined energy requirements of the rotors 2 and 10 are relatively low. that the blades 12-15 of the rotor This is due to the fact that the blades 12-15 of the rotor 10 need not perform any (or any pronounced) comminuting or chopping action; such action is performed by the blades 3-6 of the rotor 2 in conjunction with the stationary knives 8.

The positioning of the knives 8 at a level below the entire, or at least below the major portion of the rotor 10 is made possible by installing these knives on the cover 18 which underlies the rotor 10 and cooperates with the blades 12-15 to steer the stalks 52, 53 . . . toward the shredding station.

The resistance which the blades 12-15 offer to downward movement of the stalks is nil or negligible because the stalks cannot be convoluted around the rotor 10. This is prevented by the lid 26 which rather closely conforms to the lower part of the path for the radially outermost portions of the blades 12–15 and thus ensures that the stalks are compelled to advance toward the chopping station.

Figure 2:
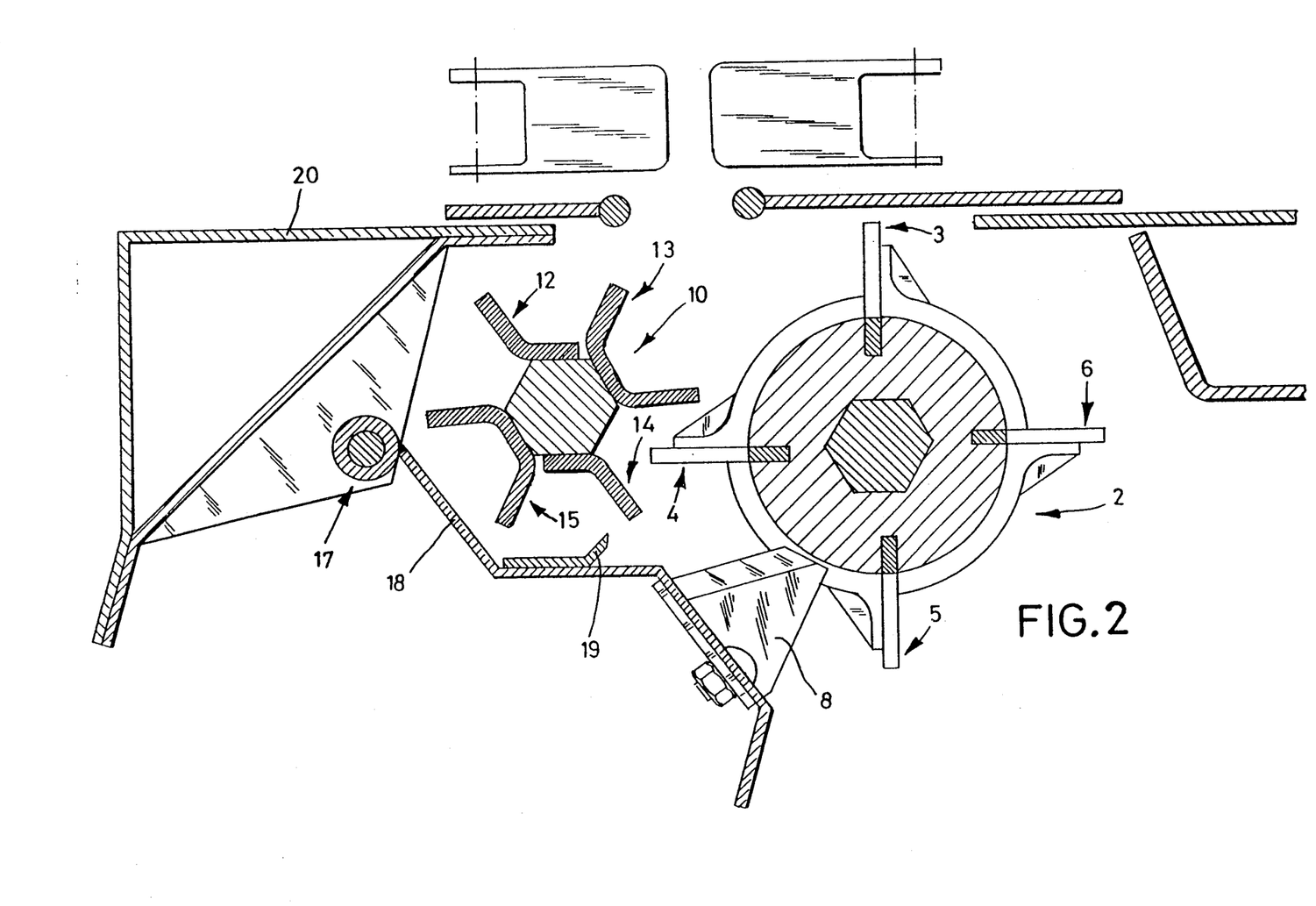
FIG. 2 is a sectional view similar to that of FIG. 1 but showing a portion of a second adapter with a counterknife for the second rotor.

FIG. 2 shows a portion of a somewhat modified adapter. The main difference between the adapters of FIGS. 1 and 2 is that the lid 26 of FIG. 1 is replaced with a counterknife 19 which cooperates with the sections of the blades 12–15 to steer the stalks toward the chopping station. The cover 18 of FIG. 2 can support a single elongated counterknife 19 of a composite counterknife consisting of a series of discrete counterknives.

In each of the heretofore described embodiments of the improved adapter, the cover 18 prevents the stalks from simply descending vertically downwardly without undergoing a chopping or comminuting action and without being thereupon propelled by the blades 3–6 to spread out over a large area as indicated in FIG. 8. The counter-knife 19 of FIG. 2 even more reliably prevents any winding of stalks and/or weeds growing in a field onto the rotor 10.

Figure 3:
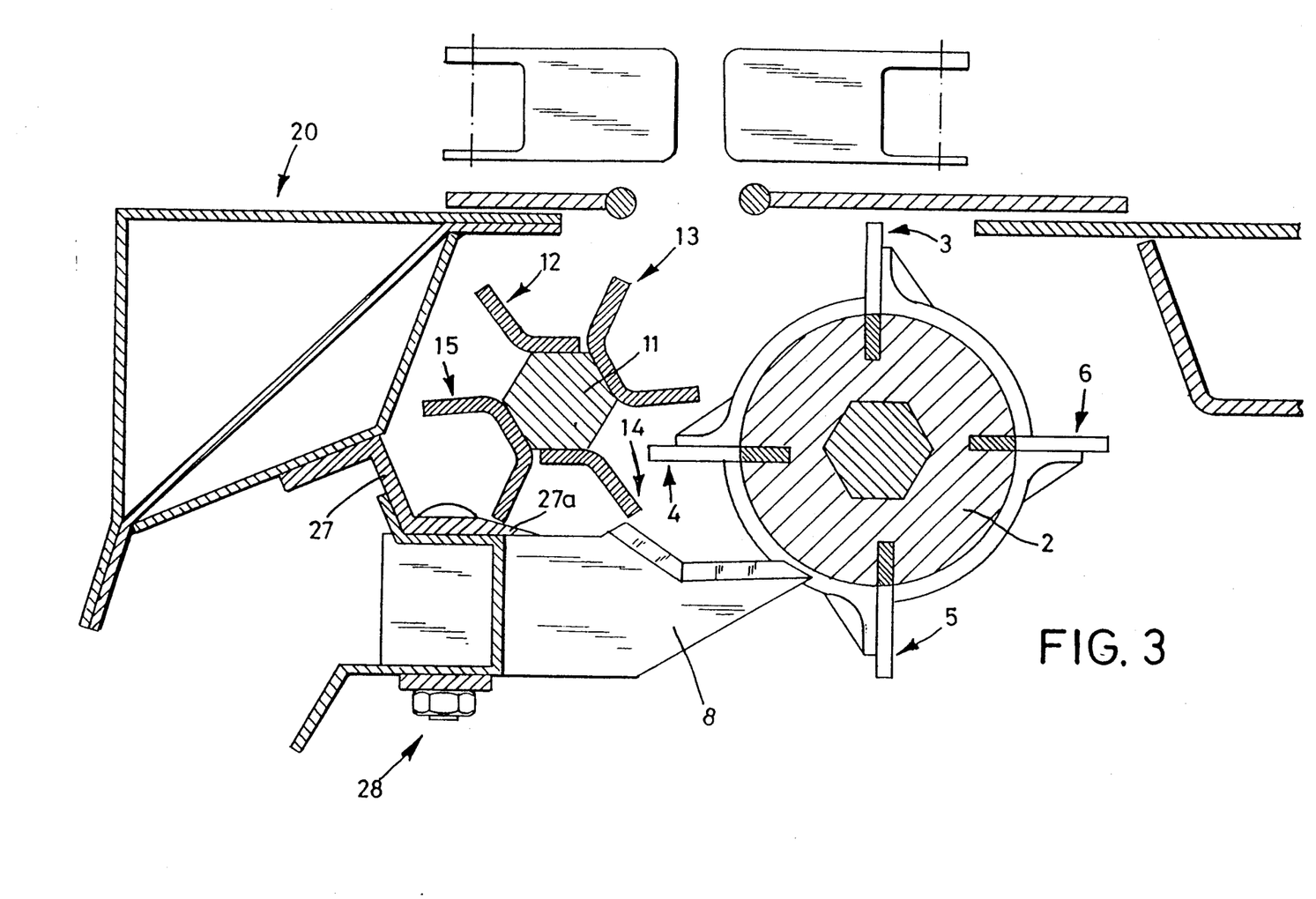
FIG. 3 is a sectional view similar to that of FIG. 1 or 2 but showing a portion of a third adapter with differently mounted knives.

Referring to FIG. 3, there is shown a portion of an adapter or attachment wherein the cover 18 (or at least a substantial part of the cover 18) is omitted and the knives 8 are nearly directly mounted on the frame 20. The latter comprises or is connected with an elongated carrier 27, and the knives 8 are secured to the carrier 27 by discrete fasteners 28. This renders it possible to shift the knives 8 in a direction to the right (in order to compensate for wear) and to thereupon retighten the fasteners 28 so that the knives are reliably held in the newly selected positions.

A portion of the carrier 27 (shown at 27a) can be said to constitute a functional equivalent of the aforediscussed counterknife 19.

Figure 4:
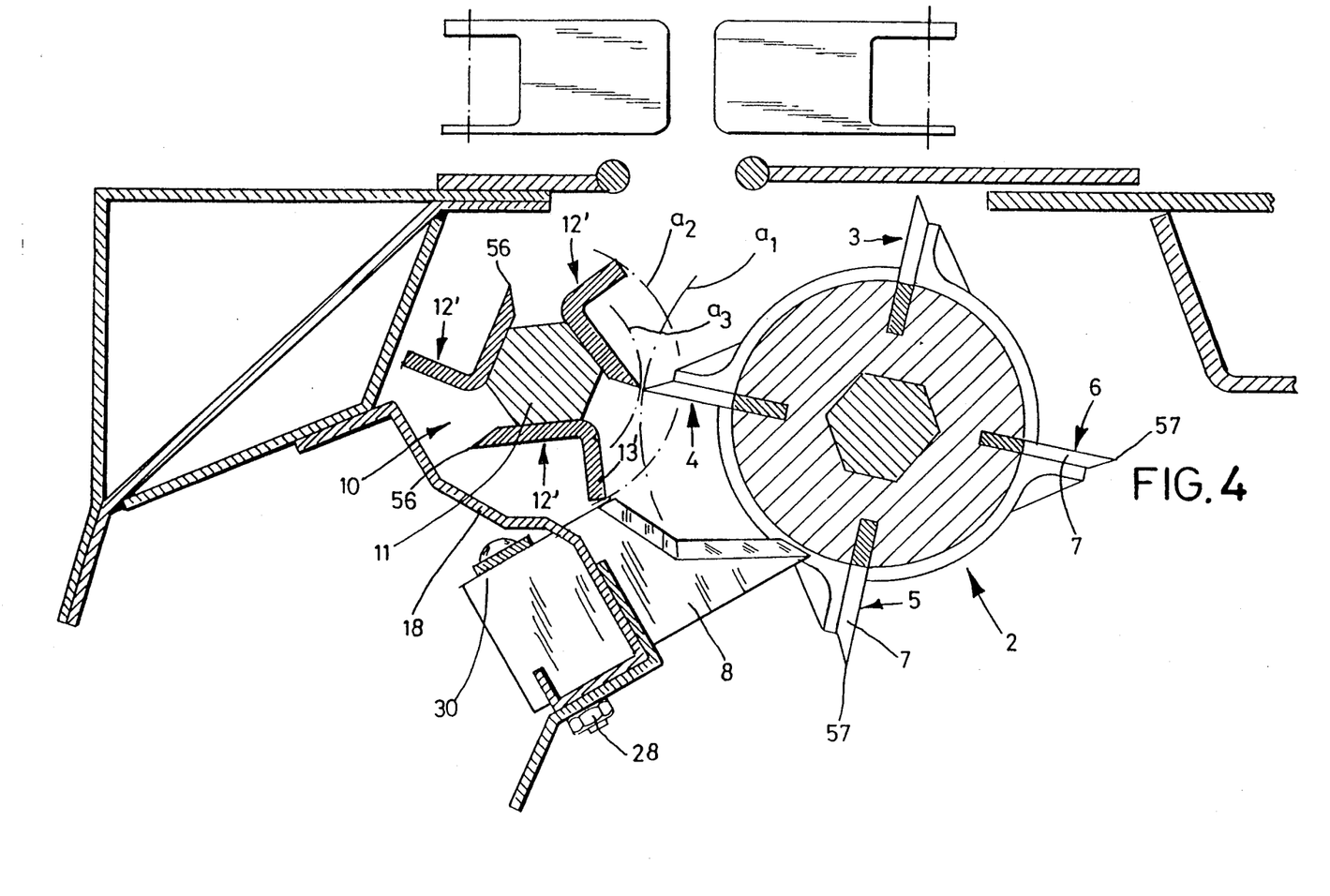
FIG. 4 is a sectional view similar to those of FIGS. 1-3 but a portion of a fourth adapter with differently mounted rotors which have blades with cutting edges.

FIGS. 1 to 3 show that the radially outermost portions of the blades 3–6 and 12–15 need not be sharpened to exhibit pronounced cutting edges. However, FIG. 4 shows a further adapter or attachment wherein all three blades 12' of the rotor 10 and all four blades 3–6 have pronounced cutting edges 56, 57, respectively. The circular path which is defined by the cutting edges 56 is shown at a3. The larger circular path which is defined by the radially outermost portions of sections 13' of the blades 12' is shown at a2, and the still larger circular path which is defined by the orbiting cutting edges 57 is shown at a1. The paths a1 and a2 intersect each other at a level above the knives 8; however, the shafts 9, 11 drive the two rotors of FIG. 4 in such a way that the blades 3–6 and 12' bypass each other. The paths a1 and a3 touch or nearly touch each other to ensure that the stalks are compelled to enter the slots 7 of the blades 3–6 or to undergo a certain at least partial cutting or squashing or squeezing action between the neighboring cutting edges 56 and 57. The blades 12' are substantially L-shaped. The partial squashing, squeezing or severing of stalks between the neighboring cutting edges 56 and 57 is completed by the knives 8 in cooperation with the sharp edges bounding the slots 7 in the blades 3–6 of the rotor 2. Again, the knives 8 are located at a level below the rotor 10 so that they do not interfere with the squashing and/or partial cutting action of the blades 12' while enabling the blades 3–6 to propel the shredded stalks well to the right beyond the six o'clock position of the rotor 2.

FIG. 4 further shows that the knives 8 can be mounted on a cover 18 by means of fasteners 28 which cooperate with the lowermost portion of the cover 18 and with a carrier 30 to reliably but adjustably hold the knives in selected positions relative to the rotor 2.

Figure 5:
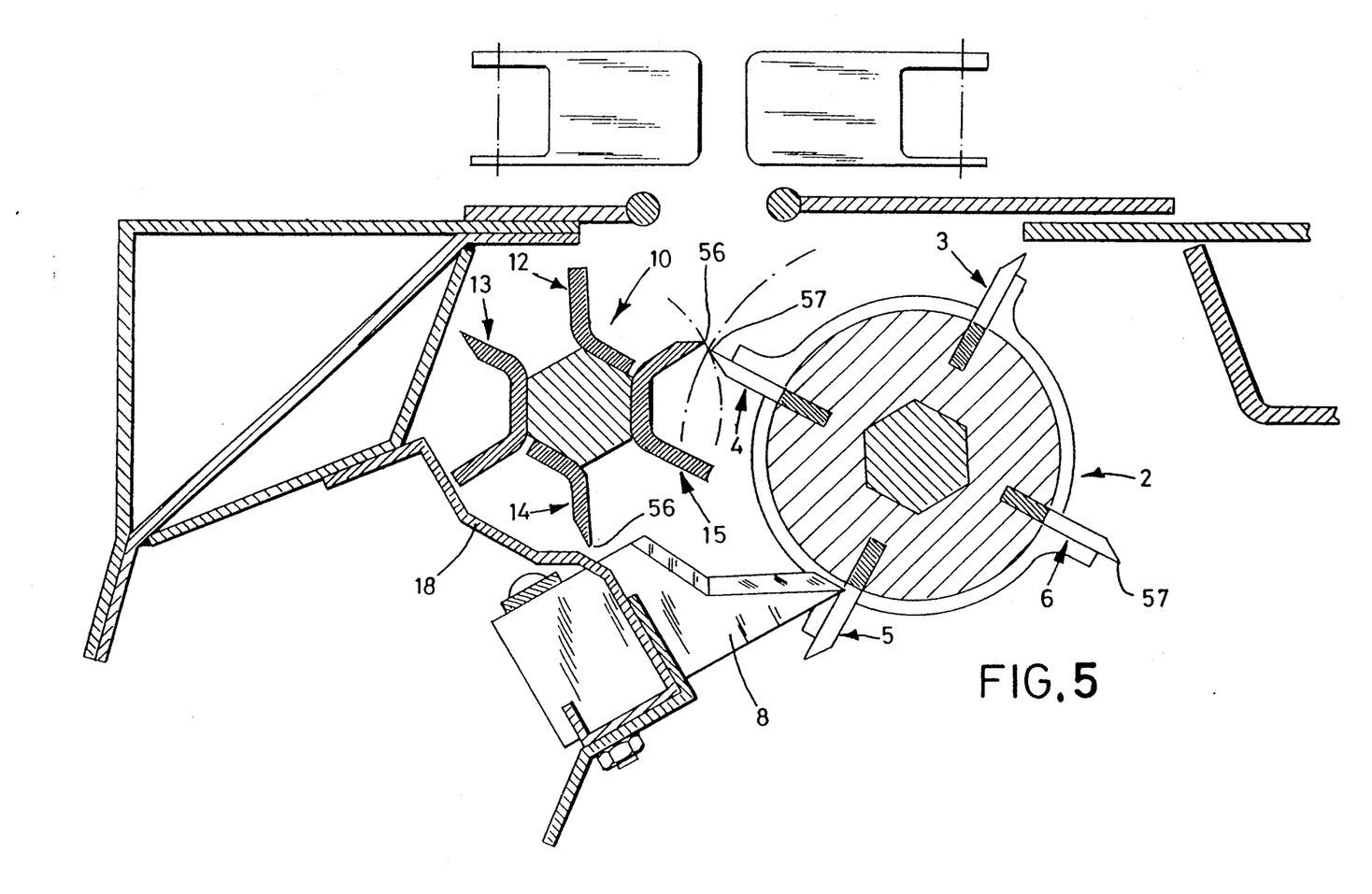
FIG. 5 shows a modification of the structure which is shown in FIG. 4.

The adapter or attachment which embodies the structure of FIG. 5 is similar to the adapter of FIG. 4 except that the cutting edges 57 of the blades 3–6 slide along the cutting edges 56 of the blades 12–15 to reduce the likelihood of winding of stalks onto the rotor 10. In addition, the cutting edges 56 and 57 cooperate to at least partially sever the stalks, and the severing action is thereupon continued and completed by the knives 8 in cooperation with the blades 3–6. Still further, the structure of FIG. 5 prevents penetration of vegetable matter into the necessary slots of the ploughs. This, in turn, reduces friction and wear and contributes to a reduction of the energy requirements.

Figure 6:
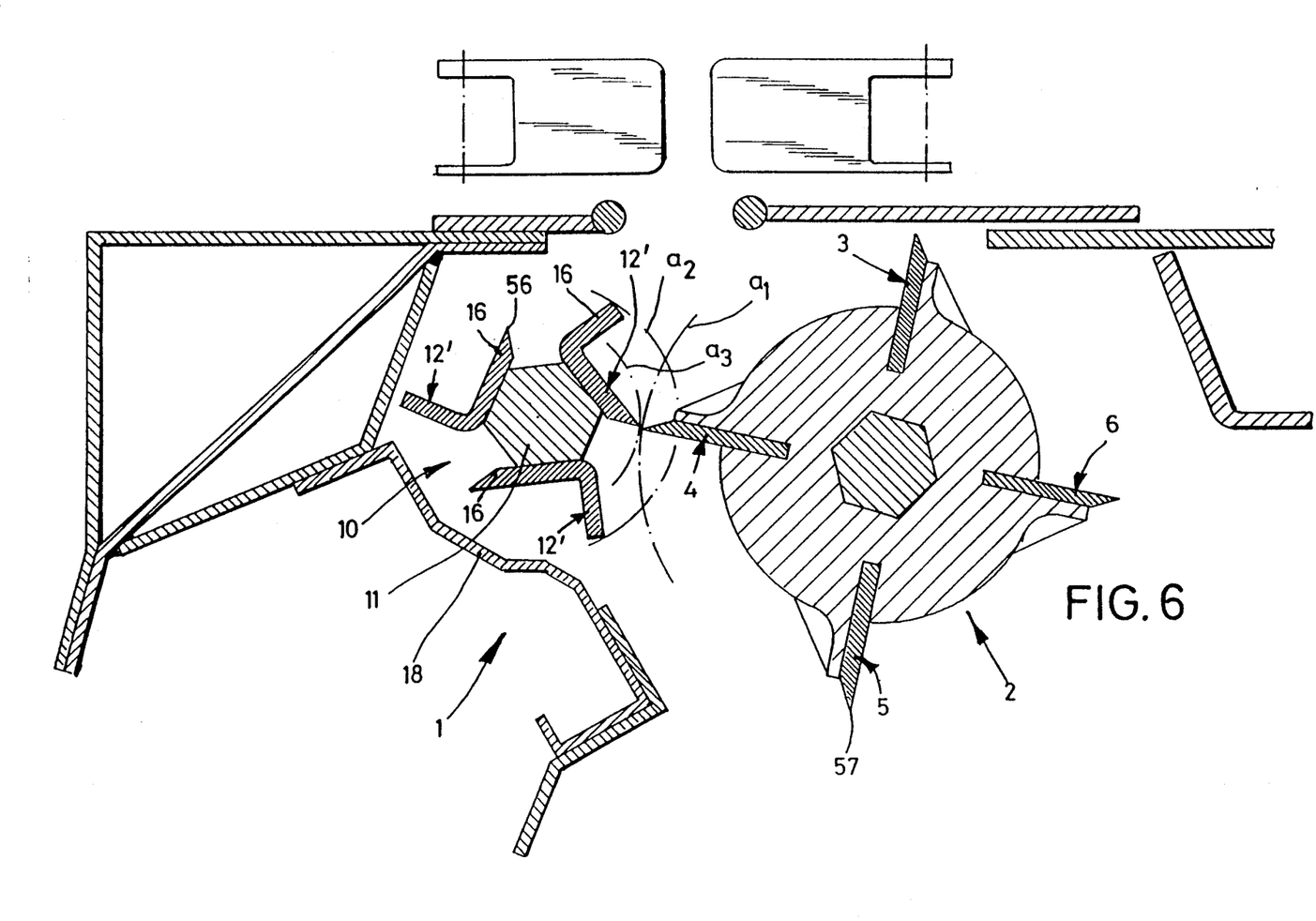
FIG. 6 illustrates the structure of FIG. 4 but without a set of stationary knives and with a first rotor having modified blades.

FIG. 6 shows that the knives 8 constitute a desirable but, nevertheless, optional feature of the improved adapter. Thus, the knives 8 can be omitted, at least when the rotors 2 and 10 cooperate in a manner as described with reference to FIG. 4 (see FIG. 6). This renders it possible to dispense with the slots 7 in the blades 3–6 of the rotor 2. The shredding action is performed exclusively by the cutting edges 56 and 57. The adapter 1 of FIG. 6 still provides ample room to propel the shredded stalks to the right well beyond the six o'clock position of the rotor 2 under the action of the rapidly rotating blades 3–6. The cooperating cutting edges 56, 57 in the apparatus of FIG. 6 perform a squeezing or squashing and/or a clean cutting action.

The severing device 54 at the front ends of the rotors 2, 10 (FIG. 7) can assume any one of a number of different shapes. For example, the device 54 can comprise one or more rotary disc-shaped knives with or without teeth at their peripheries. Furthermore, the severing device 54 can comprise one or more substantially sickle-shaped knives or cutters each of which follows, at least in part, the outline of the adjacent front end of the rotor 2 and/or 10. The arcuate cutting edge(s) of the severing device 54 at the front ends of the rotors 2, 10 can face in the direction of forward movement of the adapter or attachment 1 with the harvesting machine. Reference may be had, for example, to published German patent application No. 38 28 358 which describes suitable severing devices.

It is further within the purview of the invention to interchange the features which are shown in FIGS. 1 to 6, to increase or reduce the number of blades on the rotor 2 and/or 10, to change the cross-sectional areas and/or outlines of the blades on the rotor 2 and/or 10, to provide discrete drive means for each of the shafts 9 and 11, to provide other means for delivering stalks between the rotors 2 and/or 10 as well as to carry out additional changes and/or modifications without departing from the spirit of the invention.

The adapter 1 can comprise two or more pairs of rotors 2, 10, one pair for each of two or more neighboring rows of stalks.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A stalk chopping adapter for use with a mobile machine for harvesting corn and other stalk type crops, comprising a frame connectable with and movable by the machine along a crop growing field; first and second substantially parallel elongated rotors supported by said frame and being adjacent the ground of the crop growing field during harvesting, said first rotor including a plurality of substantially longitudinally extending slotted first external blades and said second rotor having a plurality of substantially longitudinally extending second external blades; means for directing stalks between said rotors; means for driving said rotors in opposite directions so that the stalks which are directed between said rotors are engaged and entrained by said first and second blades in a downward direction toward the ground; and stationary knives carried by said frame and extending into the slots of said first blades to sever the stalks in cooperation with said first but not with said second blades.

2. The adapter of claim 1, wherein said second rotor has an upper side and an underside, and further comprising a cover adjacent the underside of said second rotor.

3. The adapter of claim 1, further comprising means for pivotally connecting said knives to said frame.

4. The adapter of claim 1, wherein at least one of said second blades has a substantially U-shaped cross-sectional outline.

5. The adapter of claim 1, wherein at least one of said second blades has a substantially V-shaped cross-sectional outline.

6. The adapter of claim 1, wherein at least one of said second blades has a substantially L-shaped cross-sectional outline.

7. The adapter of claim 1, wherein at least one of said second blades has a cutting edge.

8. The adapter of claim 1, wherein at least one of said first blades has a cutting edge.

9. The adapter of claim 1, wherein at least one of said first blades and at least one of said second blades has a cutting edge, said cutting edges cooperating to crush and/or at least partially sever stalks between said rotors.

10. The adapter of claim 1, wherein said first blades have radially outermost portions which orbit along a first circular path and said second blades have radially outermost portions which orbit along a second circular path intersecting said first path, said driving means including means for rotating said rotors so that said first and second blades bypass each other.

11. The adapter of claim 10, wherein the outermost portion of at least one of said blades constitutes a cutting edge.

12. The adapter of claim 1, wherein said blades have radially outermost portions and the radially outermost portions of said first blades slide along the radially outermost portions of said second blades when said rotors are rotated by said driving means.

13. The adapter of claim 1, wherein said second blades have radially outermost portions which orbit along a circular path in response to rotation of said second rotor, and further comprising a cover having an inner side adjacent a portion of and at least substantially conforming to said path.

14. The adapter of claim 13, wherein said cover is supported by said frame and said knives are supported by said cover.

15. The adapter of claim 1, further comprising a cover for a portion of said second rotor and at least one counterknife provided on said cover and cooperating with said second blades to strip the stalks off said second blades in response to rotation of said second rotor.

16. The adapter of claim 1, wherein said rotors have front and rear portions and further comprising a cutter carried by the frame at the front portions of said rotors and having means for severing the stalks close to the ground while the machine is in motion.

17. The adapter of claim 16, wherein said cutter includes a rotary disc having a toothed peripheral cutting edge.

18. The adapter of claim 16, wherein said cutter has an arcuate cutting edge which faces in the direction of movement of the machine.

19. The adapter of claim 16, wherein said rotors have cores for the respective blades, said blades forming helices around the respective cores and said cutter conforming to the outlines of helices of at least some of said blades.

20. A stalk chopping adapter for use with a mobile machine for harvesting corn and other stalk type crops, comprising a frame connectable to and movable by the machine, first and second substantially parallel elongated rotors supported by said frame, said first rotor having a first set of elongated substantially longitudinally extending blades and said second rotor having a second set of elongated substantially longitudinally extending blades, at least one blade of at least one of said sets having a cutting edge and the blades of said second set having radially outermost portions which orbit along a circular path in response to rotation of said second rotor; means for directing stalks between said rotors; a closure adjacent and at least substantially conforming to a portion of said path; at least one counterknife provided on said closure and cooperating with the blades of said second set to strip the stalks off said second rotor; and means for driving said rotors in opposite directions so that said sets of blades engage and entrain the stalks downwardly.

21. The adapter of claim 20, wherein all of said blades have cutting edges and the blades of said first set cooperate with the blades of said second set to crush and/or at least partially sever the stalks which are directed between said rotors while said rotors are driven.

22. The adapter of claim 20, wherein the blades of said first set have radially outermost portions which orbit along a second circular path which intersects the path of the radially outermost portions of said second blades, said driving means including means for rotating said rotors so that the blades of said first set bypass the blades of said second set.

23. The adapter of claim 20, wherein the blades of said set have radially outermost portions and the radially outermost portions of the blades of one of one of said sets slide along the radially outermost portions of the blades of the other of said sets when said rotors are driven.

24. The adapter of claim 20, wherein said rotors have front and rear portions and further comprising a cutter which is carried by said frame at the front portions of said rotors and includes means for severing the stalks close to the ground while the machine is in motion.

* * * * *